(12) United States Patent
Patel et al.

(10) Patent No.: US 9,973,545 B2
(45) Date of Patent: May 15, 2018

(54) METHOD AND DEVICE FOR MANAGING CIRCUIT SWITCHED DATA CALLS

(71) Applicant: AT&T Intellectual Property I, LP, Atlanta, GA (US)

(72) Inventors: Vimal Patel, Morganville, NJ (US); James Ibezim, Wayside, NJ (US); Koan S. Chong, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 434 days.

(21) Appl. No.: 14/464,258

(22) Filed: Aug. 20, 2014

(65) Prior Publication Data

US 2016/0057174 A1 Feb. 25, 2016

(51) Int. Cl.
*H04L 29/06* (2006.01)
*H04W 4/16* (2009.01)
*H04W 76/02* (2009.01)

(52) U.S. Cl.
CPC ........... *H04L 65/1069* (2013.01); *H04W 4/16* (2013.01); *H04W 76/026* (2013.01)

(58) Field of Classification Search
CPC ...... H04L 65/1069; H04W 4/14; H04W 76/02
See application file for complete search history.

(56) References Cited

U.S. PATENT DOCUMENTS

| 4,723,268 | A | * | 2/1988 | Newell | H04M 11/06 379/902 |
| 4,965,883 | A | * | 10/1990 | Kirby | H03M 5/145 714/49 |
| 5,982,768 | A | * | 11/1999 | Bellenger | H04M 11/062 370/352 |

(Continued)

FOREIGN PATENT DOCUMENTS

| EP | 1129550 A1 | 9/2001 |
| GB | 2485355 A | 5/2012 |

(Continued)

OTHER PUBLICATIONS

Gritzalis, Dimitris et al., "The Sphinx enigma in critical VoIP infrastructures: Human or botnet?." Information, Intelligence, Systems and Applications (IISA), 2013 Fourth International Conference, IEEE, 2013.

(Continued)

*Primary Examiner* — Noel R Beharry
*Assistant Examiner* — Rodrick Mak
(74) *Attorney, Agent, or Firm* — Guntin & Gust, PLC; Jay H. Anderson (57) ABSTRACT

Aspects of the subject disclosure may include, for example, generating a tone during first communications with another communication device, providing the tone to a gateway to cause the gateway to transmit a re-invite message without the gateway providing the tone to the other communication device, receiving the re-invite message where the re-invite message includes a request for a higher bandwidth than the (Continued)

first communications, providing a response message to the gateway responsive to the re-invite message where the providing of the response message causes the gateway to provide the tone to the other communication device. Other embodiments are disclosed.

20 Claims, 8 Drawing Sheets

(56) References Cited

U.S. PATENT DOCUMENTS

| | | | |
|---|---|---|---|
| 5,991,410 A * | 11/1999 | Albert | G06Q 20/0855 380/270 |
| 6,466,544 B1 * | 10/2002 | Sen | H04W 72/0453 370/231 |
| 6,483,820 B1 * | 11/2002 | Davidson | H04W 28/16 370/329 |
| 6,542,739 B1 | 4/2003 | Garner | |
| 6,708,034 B1 * | 3/2004 | Sen | H04L 12/5695 370/328 |
| 6,731,649 B1 | 5/2004 | Silverman | |
| 6,741,705 B1 | 5/2004 | Nelson et al. | |
| 6,965,611 B2 * | 11/2005 | Luddy | H04B 1/7075 370/205 |
| 7,054,286 B2 | 5/2006 | Ertel et al. | |
| 7,126,711 B2 | 10/2006 | Fruth | |
| 7,512,090 B2 | 3/2009 | Benitez Pelaez et al. | |
| 7,545,818 B2 | 6/2009 | Chen et al. | |
| 7,602,815 B2 | 10/2009 | Houghton et al. | |
| 7,684,383 B1 * | 3/2010 | Thompson | H04M 7/1295 370/352 |
| 7,693,162 B2 | 4/2010 | McKenna et al. | |
| 7,701,931 B2 | 4/2010 | Kajiwara | |
| 8,019,587 B1 * | 9/2011 | Venkatraman | H04L 41/0816 703/21 |
| 8,089,952 B2 | 1/2012 | Spade et al. | |
| 8,171,146 B2 | 5/2012 | Chen et al. | |
| 8,199,762 B2 | 6/2012 | Michelson et al. | |
| 8,509,114 B1 | 8/2013 | Szajdecki | |
| 8,514,459 B2 * | 8/2013 | Mita | H04M 11/066 358/434 |
| 8,514,980 B2 | 8/2013 | Kuhtz | |
| 8,687,650 B2 | 4/2014 | King | |
| 8,711,857 B2 | 4/2014 | Jackson et al. | |
| 8,761,792 B2 | 6/2014 | Sennett et al. | |
| 2003/0002476 A1 | 1/2003 | Chung et al. | |
| 2003/0058851 A1 * | 3/2003 | Goldman | H04L 12/5695 370/389 |
| 2004/0059823 A1 * | 3/2004 | Garakani | H04L 29/06 709/230 |
| 2005/0195801 A1 * | 9/2005 | Chu | H04L 12/66 370/352 |
| 2008/0285088 A1 * | 11/2008 | Tidwell | H04M 11/066 358/402 |
| 2010/0067525 A1 * | 3/2010 | Matsui | H04L 12/5695 370/389 |
| 2010/0268797 A1 * | 10/2010 | Pyrik | H04L 12/2602 709/220 |
| 2011/0109936 A1 | 5/2011 | Coffee et al. | |
| 2011/0116497 A1 * | 5/2011 | Bolocan | H04Q 1/4575 370/352 |
| 2012/0047273 A1 * | 2/2012 | Ajero | H04L 12/2801 709/228 |
| 2014/0050214 A1 * | 2/2014 | Tung | H04L 65/102 370/352 |

FOREIGN PATENT DOCUMENTS

| | | |
|---|---|---|
| WO | 2000/74428 A1 | 12/2000 |
| WO | 2006116396 A2 | 11/2006 |

OTHER PUBLICATIONS

Hautakorpi, Jani et al., "Requirements from Session Initiation Protocol (SIP) Session Border Control (SBC) Deployments." RFC5853, IETF (2010).

Hawrylyshen, A. et al., "SIPPING Working Group J. Hautakorpi, Ed. Internet-Draft G. Camarillo Intended status: Informational Ericsson Expires: Dec. 18, 2008 R. Penfield Acme Packet." (2008).

* cited by examiner

METHOD AND DEVICE FOR MANAGING CIRCUIT SWITCHED DATA CALLS

FIELD OF THE DISCLOSURE

The subject disclosure relates to a method and device for managing circuit-switched data calls.

BACKGROUND

Communication devices engage in various communication services which can include voice, video, data and/or messaging. Various techniques are utilized for establishing communication services including packet-switched communication, circuit-switched communication and a combination thereof.

As technology improves, user demand for the technology also grows. Radio access network bandwidth can be a limited resource and efficient use of the bandwidth is often desired.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for detecting or otherwise identifying Circuit-Switched Data CSD calls (e.g., a facsimile, a medical alert, fire alarms, credit card Point-Of-Sale (POS), or Telecommunications Device for the Deaf (TDD)). Adjustments can then be made for the CSD call, such as a bandwidth adjustment.

In one or more embodiments, tones (e.g., an ANS tone, an ANSam tone or another answer tone such as a 2225 Hz tone) can be generated (e.g., by an end user device) to indicate that the communication is for a CSD call. The tone can be detected (e.g., by a gateway) to trigger a re-invite procedure (e.g., with the end user device). The re-invite procedure can include a higher bandwidth request and/or a selection for a codec such as for pulse code modulation (e.g., G.711 coding) to establish a more robust data session for a more reliable CSD call.

In one or more embodiments, when the tone is initially detected (e.g., by the gateway) the rest of the tone can be blocked from reaching another end user device. In one or more embodiments, responsive to the re-invite procedure being completed, the tone can be provided to the other end user device to enable the CSD call between the end user devices. One or more of the exemplary embodiments can include wired and/or wireless connections for the voice and/or CSD communications. Other embodiments are described in the subject disclosure. One or more of the exemplary embodiments can be applied to any VoIP methods to communicate including wired-line VoIP, such as cable modem, WiFi, DSL and so forth.

One embodiment of the subject disclosure is a method that includes facilitating establishing, by a gateway including a processor, a communication session between first and second end user devices utilizing a first invite message transmitted to the second end user device. The gateway can detect a tone generated by the second end user device. Responsive to the detecting of the tone, the gateway can facilitate an adjustment to the communication session for establishing an adjusted communication session between the first and second end user devices by utilizing a second invite message transmitted to the second end user device. The tone can be prevented from being transmitted to the first end user device prior to the adjustment to the communication session, and the adjusted communication session can be for a circuit-switched data call between the first and second end user devices. The gateway can provide the tone to the first end user device after the adjustment to the communication session.

One embodiment of the subject disclosure includes a machine-readable storage medium, comprising executable instructions that, when executed by a processor of a gateway, facilitate performance of operations, including facilitating establishing communications between first and second end user devices by providing a first invite message to the second end user device. The gateway can detect a tone generated by the second end user device. Responsive to the detecting of the tone, the gateway can provide a second invite message to the second end user device without providing the tone to the first end user device, where the second invite message requests a higher bandwidth than the first invite message. The gateway can receive a response message associated with the second invite message from the second end user device for establishing a circuit-switched data call between the first and second end user devices. Responsive to the receiving of the response message, the gateway can provide the tone to the first end user device.

One embodiment of the subject disclosure includes a communication device that has a processor and a memory that stores executable instructions that, when executed by the processor, facilitate performance of operations, including generating a tone during first communications with another communication device, where the first communications was established utilizing an invite message. The communication device can provide the tone to a gateway to cause the gateway to transmit a re-invite message without the gateway providing the tone to the other communication device. The communication device can receive the re-invite message, where the re-invite message includes a request for a higher bandwidth than the first communications. The communication device can provide a response message to the gateway responsive to the re-invite message, where the providing of the response message causes the gateway to provide the tone to the other communication device. The communication device can enable second communications with the other communication device, where the second communications is established based on the re-invite and response messages, and where the second communications has the higher bandwidth than the first communications.

Figure 1:
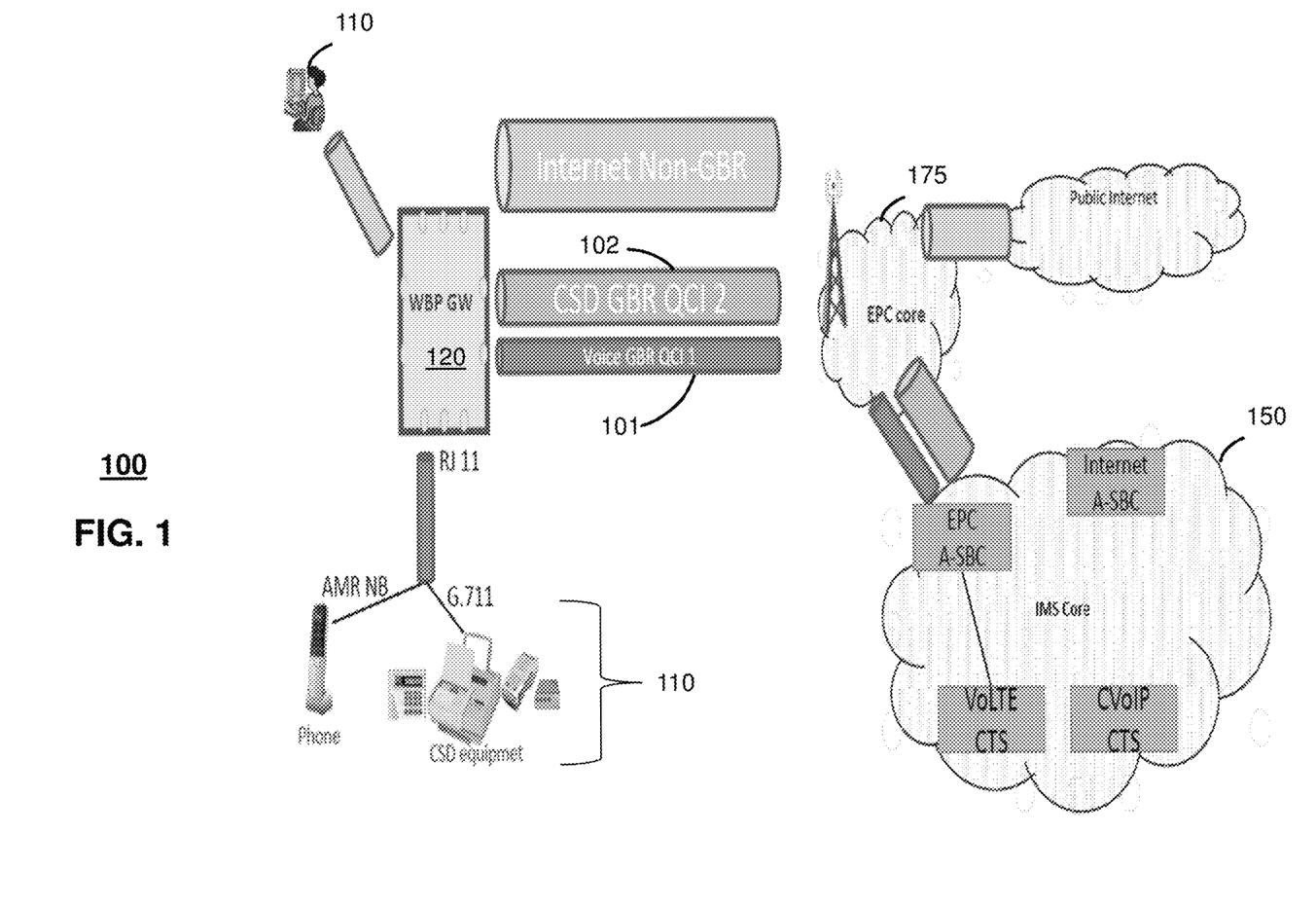
FIG. 1 depicts an illustrative embodiment of a communication system that manages circuit-switched data calls utilizing tone detection.

FIG. 1 depicts an illustrative embodiment of a system 100 that provides communication services to communication devices 110, including wired and wireless communication services. System 100 enables detection, or otherwise identification, of CSD calls (e.g., a facsimile, a medical alert, fire alarms, POS transactions, or TDD). Adjustments can then be made for the CSD call, including bandwidth increases, protocol changes, and so forth. In one or more embodiments, system 100 enables a communication device to utilize a single telephone number for both voice calls and for CSD calls.

The communication devices 110 can be various types of devices, including end user devices, such as facsimile machines, mobile phones, tablets, laptop computers, desktop computers, set top boxes, personal digital assistants, vehicle navigation systems, and so forth. System 100 can include various network elements including a gateway 120, Internet Protocol Multimedia Subsystem (IMS) elements in an IMS network or core 150, and/or Evolved Packet Core (EPC) elements in an EPC network or core 175. Various other devices can also be utilized to facilitate establishing communications for the communication devices in system 100 including routers, switches, Mobility Management Entity (MME) devices, Evolved Universal Terrestrial Radio Access Network (E-UTRAN) Node (eNB) eNB devices, and so forth.

In one or more embodiments, the gateway 120 can detect a request for a CSD call and can provide an invite message to an end user device 110 to facilitate establishing the CSD call. The invite message can include a request for a higher bandwidth and/or options for other protocols/techniques to be utilized for the CSD call, such as an option for utilizing a codec for pulse code modulation (e.g., G.711 coding) to establish a more robust data session for the CSD call. In one or more embodiments, the gateway 110 can identify the request for the CSD call during a voice call 101 established between end user devices 110 by detecting a tone generated by one of the end user devices. The voice call 101 can initially be established utilizing an Adaptive Multi-Rate (AMR) audio codec (e.g., AMR Narrow Band (AMR NB)) having a first Quality of Service Class Identifier (QCI 1).

The detected tone, such as an ANS tone, an ANSam tone, or another answer tone (e.g., a 2225 Hz tone), can trigger or otherwise enable the gateway 120 to provide an invite message to one of the end user devices 110 (e.g., the end user device that generated the tone) in order to facilitate establishing a more robust data session for the CSD call, such as via a CSD call having a different class of quality of service—QCI 2. As an example, QCI 1 can operate at approximately 40 kbps while QCI 2 operates at approximately 80 kbps (or approximately 500 kbps for a video call). The detection of the tone by the gateway 120 and the establishment of the CSD call via a re-invite procedure can allow for a single billing for the CSD call. System 100 enables dynamic Radio Access Network (RAN) bearer switching between voice calls and CSD calls through use of tone detection by a network element (e.g., gateway 120).

In one or more embodiments, system 100 can provide different levels of QoS, including different Guaranteed Bit Rate (GBR) for voice calls and for CSD calls through use of tone detection and a re-invite procedure. In one or more embodiments, system 100 enables dynamic bandwidth management at the application layer while in an active session.

For instance, dynamic bandwidth control can be provided while in an audio session to allow CSD communications over VoLTE. In one or more embodiments, system 100 enables CSD equipment to reliably use wireless Long Term Evolution (LTE) network while giving bandwidth control to the end user device(s) and/or network at the application layer.

In one or more embodiments, system 100 enables a gateway or other device (e.g., a network device) to facilitate establishing communications between first and second end user devices by providing a first invite message to the second end user device. The gateway can detect a generated tone (e.g., generated by the second end user device) and can, responsive to the detecting of the tone, provide a second invite message to the second end user device without providing the tone to the first end user device, where the second invite message requests a higher bandwidth than the first invite message. The gateway can receive a response message associated with the second invite message from the second end user device for establishing a circuit-switched data call between the first and second end user devices, and can, responsive to the receiving of the response message, provide the tone to the first end user device. In one or more embodiments, the second invite message can be provided by the gateway during a voice call between the first and second end user devices that was established utilizing the first invite message.

In one or more embodiments, the tone can be generated by the second end user device during the voice call responsive to user input at the second end user device. In one or more embodiments, the second invite message can include an option for a pulse code modulation of voice frequencies coding. In one or more embodiments, the tone can be or otherwise can include an ANS tone, an ANSam tone and/or a tone with a frequency of about 2100 or 2225 Hz. In one or more embodiments, the providing of the second invite message to the second end user device can be responsive to a determination that the second end user device is associated with a subscription agreement that allows for an adjusted communication session with the higher bandwidth. In one or more embodiments, the CSD call can be one or more of a facsimile communication, a medical alert communication, a point-of-sale communication, a telecommunications device for the deaf communication, a data modem communication, and any combination thereof. In one or more embodiments, the first and second invite messages can be transmitted to the second end user device from the gateway via an internet protocol multimedia subsystem network.

Figure 2:
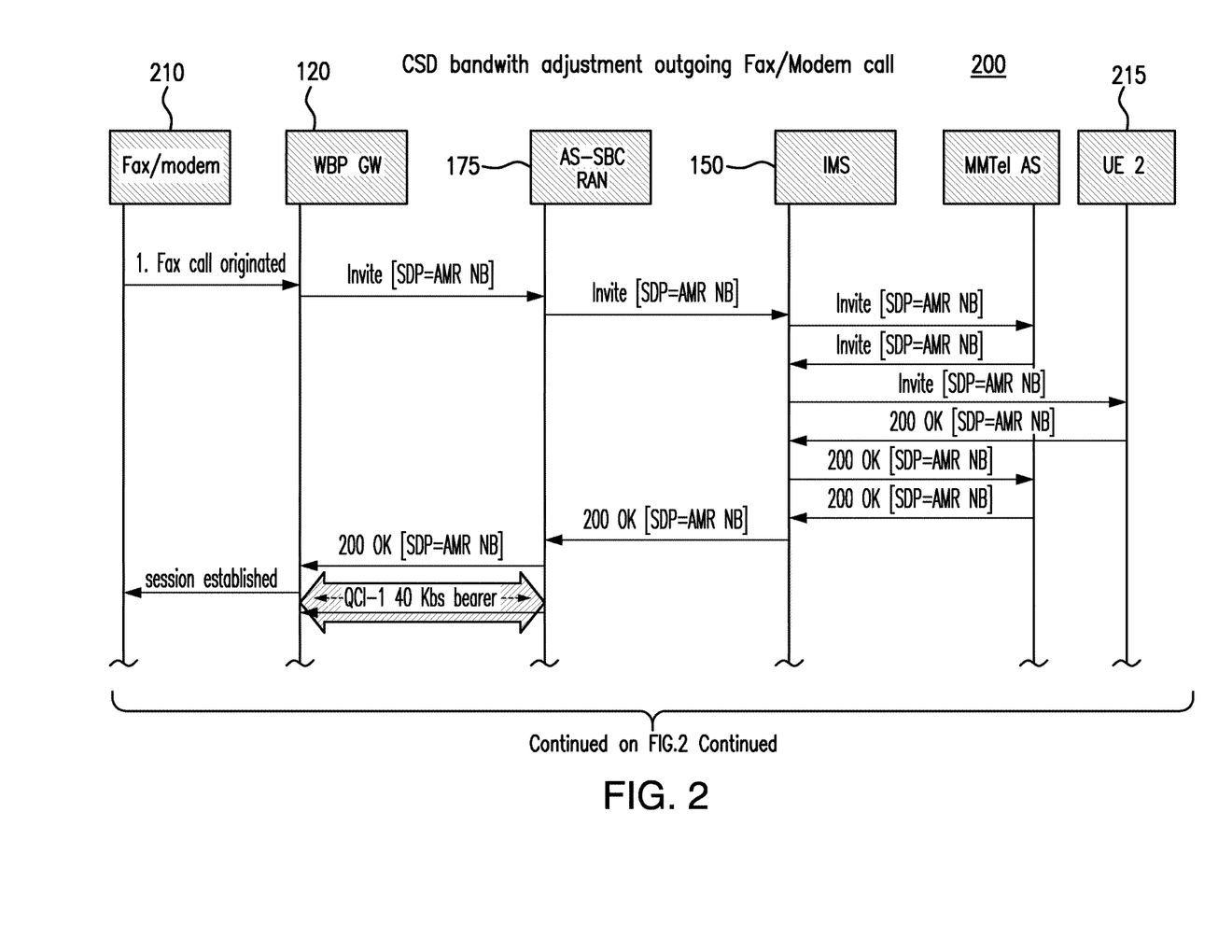
FIG. 2 depicts an illustrative embodiment of a call flow for a circuit-switched data call utilizing the system of FIG. 1.

FIG. 2 depicts an illustrative embodiment of a call flow diagram 200 that utilizes tone detection to enhance a CSD call. This particular call flow is for an outgoing CSD call (e.g., a fax or modem call), however, the exemplary embodiments can be applied to various types of CSD calls that are originated or otherwise requested by various devices. The modem 210 can originate a call to another end user device 215, which causes the gateway 120 to commence or otherwise facilitate an invite procedure including transmission of a first invite message to the end user device 215 and receipt of a response message from the end user device 215. This first invite procedure can result in establishing a first communication session, such as a voice call having a first QCI 1 (e.g., utilizing 40 Kbs). The gateway 120 can detect or otherwise identify a tone (e.g., an ANS tone, an ANSam tone or a 2225 Hz tone) being generated by the end user device 215.

The modem 210 can be initially blocked or otherwise prevented from receiving the tone while a second re-invite procedure is performed. For instance, the gateway 120 can block the modem 210 from receiving the tone and at that time can transmit a re-invite message to the end user device 215. The re-invite message can request a higher bandwidth than the first communication session and/or can have an option for a pulse code modulation of voice frequencies coding (e.g., G.711 coding). The gateway 120 can monitor, such as during the four second time period for which the tone is generated by the end user device 215, for a response message from the end user device 215 indicating an acceptance of the re-invite. Upon receiving the response message, the tone can be provided to the modem 210, such as by the gateway 120. The receiving of the response message can enable the gateway 120 to establish, or otherwise facilitate the establishing of, a more robust communication session for the CSD call, such as at a higher bandwidth. The invite and re-invite procedures, as well as the establishment of the first communication session (e.g., a voice call) and the second communication session (e.g., a CSD call) can be performed with the assistance of other network devices, including device(s) of the IMS network 150 and/or the EPC core 175.

Figure 3:
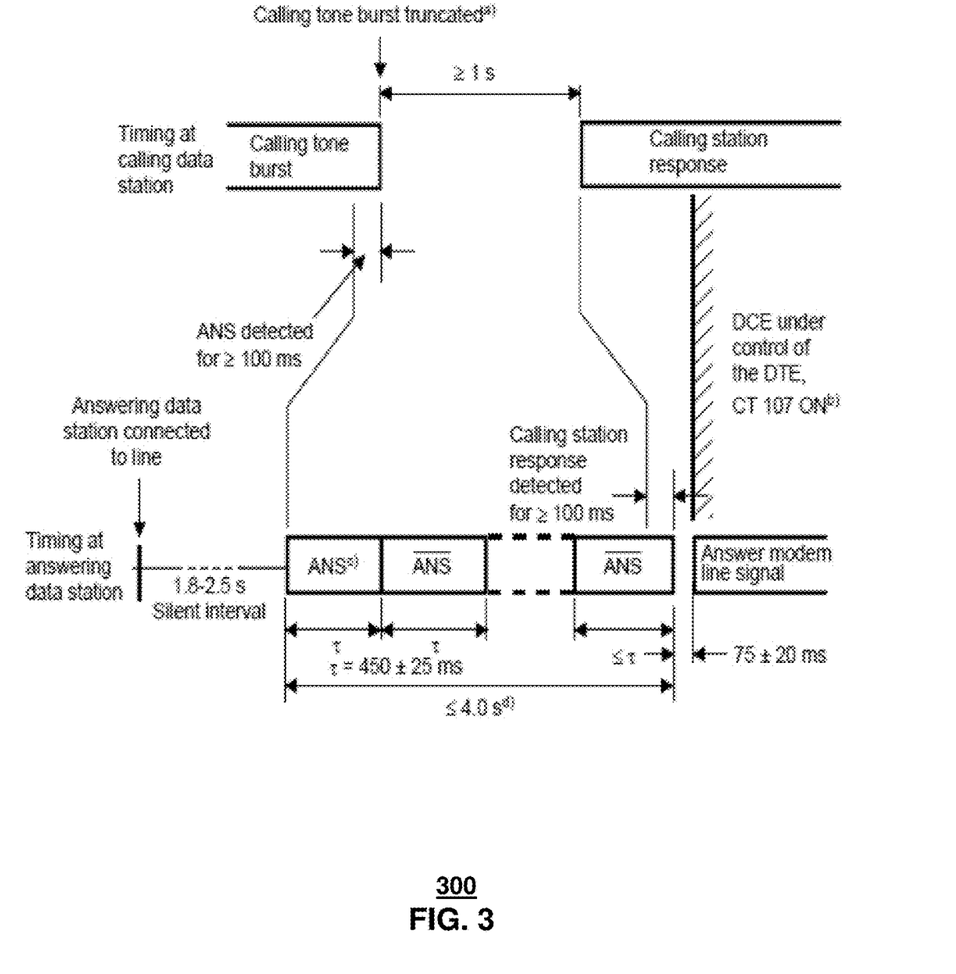
FIG. 3 depicts an illustrative embodiment of a timing diagram utilized during the circuit-switched data call of FIGS. 1 and 2.

Referring to FIG. 3, a timing diagram 300 is illustrated which depicts the use of a tone generated by one of the end user devices. The generated tone can be initially blocked, for example, by the gateway, so that the other end user device does not initially receive the tone. During the blocking of the tone, the gateway can facilitate a re-invite procedure to establish a more robust communication session for a CSD call, such as at a higher bandwidth.

In one or more embodiments, the generated tone can be an answer tone of a wireline modem. For example, the tone can be the first signal sent by an answering modem after a billing delay. For instance, the tone can be a single continuous tone, such as with a particular frequency of 2225 Hz±15 Hz (described herein as about 2100 HZ). In one or more embodiments, the tone can disable echo suppressors on international trunk connections. In one or more embodiments, the tone can include 180° phase reversals at intervals of 450 ms to disable network echo cancellers. In one or more embodiments, the tone can be modulated by a low frequency signal to indicate ITU-T V.8 capability.

In one or more embodiments, the tone can be an ANS tone with a continuous tone signal of 2100±15 Hz (described herein as about 2100 HZ) for a duration of 2.6 to 4 seconds. In one or more embodiments, on receiving a CNG tone, an answering fax machine can respond in 1.8 to 2.5 seconds after recognizing the CNG. The tone can be used as a voice and fax call discriminator. The power levels of the tone can vary and can be from 0 to −30 dBm. In one or more embodiments, detection of the tone can be used to control the echo canceller operation such that echo canceller non-linear processing (NLP) can be disabled and basic echo adaptation can be maintained in an enabled mode. In one or more embodiments, the tone can have added phase reversal of the tone at regular intervals which is illustrated by "/" preceding the ANS (or ANSam) indicating phase reversals of ANS (or ANSam). The phase reversals can be for every 450±25 ms. The phase shifts of 180° with a tolerance of 25° can be detected as valid, and those in the range of 0±110° may not be detected. Detection of the tone can require observation of a minimum of two-phase reversals occurring at 450±25 ms intervals.

In one or more embodiments, the tone can be an ANS tone with amplitude modulation (ANSam). In one or more embodiments, the tone can be maintained at a tight tolerance of 2100±1 Hz. An amplitude modulation waveform can be of a sine wave at 15±0.1 Hz. The depth of amplitude modulation can be 20±1%. After detecting ANSam, echo cancellers can be fully disabled or bypassed.

In one embodiment, phase reversals can be employed at intervals of 450±25 ms. An average transmitted power of 0 to −30 dBm can be utilized. In one or more embodiments, the CSD call can employ G.711 which can pass audio signals, for example, in the range of 300-3400 Hz and can sample them, for example, at a rate of 8,000 samples per second, with the tolerance on that rate of 50 parts per million (ppm).

Figure 4:
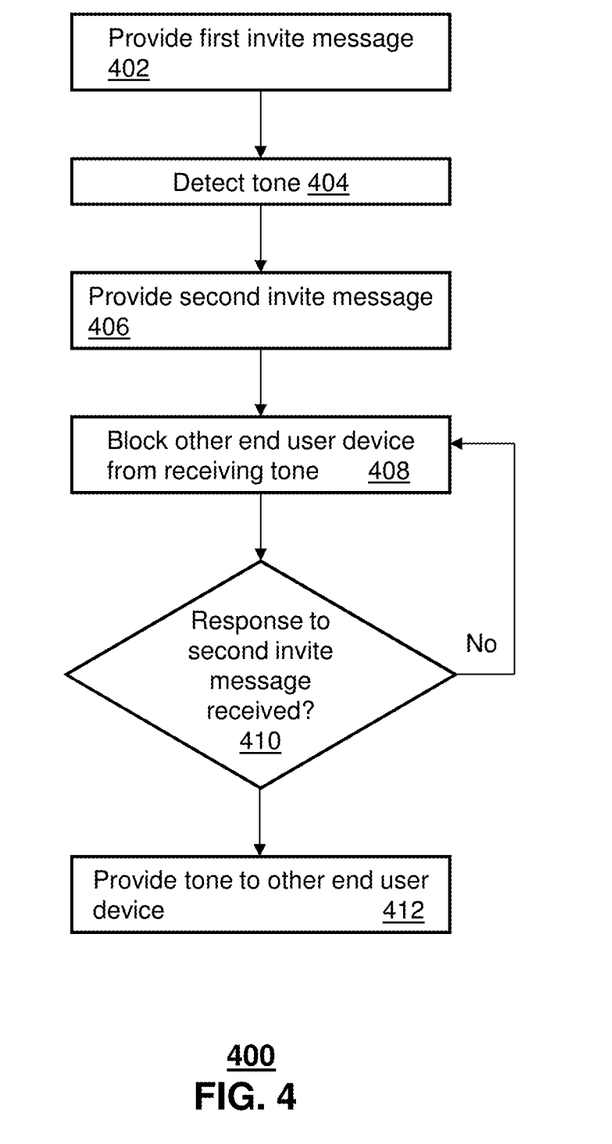
FIG. 4 depicts an illustrative embodiment of a method used in portions of the systems and call flow described in FIGS. 1-3.

FIG. 4 depicts an illustrative embodiment of a method 400 used by network devices and communication devices (e.g., end user devices) for detecting CSD calls and modifying the communication session for the CSD call. Method 400 can be performed by various devices, including the gateway 120 of FIG. 1. Method 400 can commence at 402 where the gateway 120 facilitates establishing a communication session between first and second end user devices utilizing a first invite message transmitted to the second end user device. As described herein, various types of devices can be the first and second end user devices. At 404, the gateway 120 can detect a tone that is generated by the second end user device. In one embodiment, the tone can be generated in response to user input at the second end user device, such as a user inputting a code to initiate a CSD call during a voice call that was established via the first invite message. The device generating the tone can be either the calling device or the called device (as designated according to the first communication session). For instance, a first end user device can originate a voice call to a second end user device, and, during the voice call, the first end user device can also generate a tone to establish a CSD call.

At 406, responsive to the detecting of the tone, the gateway 120 can facilitate an adjustment to the communication session in order to establish an adjusted communication session between the first and second end user devices. In one embodiment, the gateway 120 can utilize a second invite message transmitted to the second end user device. In one embodiment, the tone detected by the gateway can be initially prevented from being transmitted to the first end user device (e.g., prior to the adjustment to the communication session or prior to receiving a response message from the second end user device that corresponds to the re-invite procedure). The adjusted communication session can be for a CSD call between the first and second end user devices. The gateway 120 at 410 can monitor for the response message from the second end user device (e.g., limited to the time period for which the tone is generated). Once the response message is received or once the adjusted communication session is established, the gateway 120 at 412 can provide the tone to the first end user device. The first and second end user devices can then engage in a CSD communication session which has a higher bandwidth than the original voice call.

In one or more embodiments, the tone can include an ANS tone or an ANSam tone. In one or more embodiments, the second invite message can include a request for the higher bandwidth and an option for a pulse code modulation of voice frequencies coding (e.g., G.711 coding). In one or more embodiments, the facilitating of the adjustment to the communication session for establishing the adjusted communication session is responsive to a determination that the second end user device is associated with a subscription agreement that allows for the adjusted communication session. In one or more embodiments, the tone has a frequency of 2225 Hz. In one or more embodiments, the CSD call can be one of a facsimile communication, a medical alert communication, a point-of-sale communication, a telecommunications device for the deaf communication, a data modem communication, and any combination thereof. In one or more embodiments, the first and second invite messages can be transmitted to the second end user device from the gateway via an IMS network.

Figure 5:
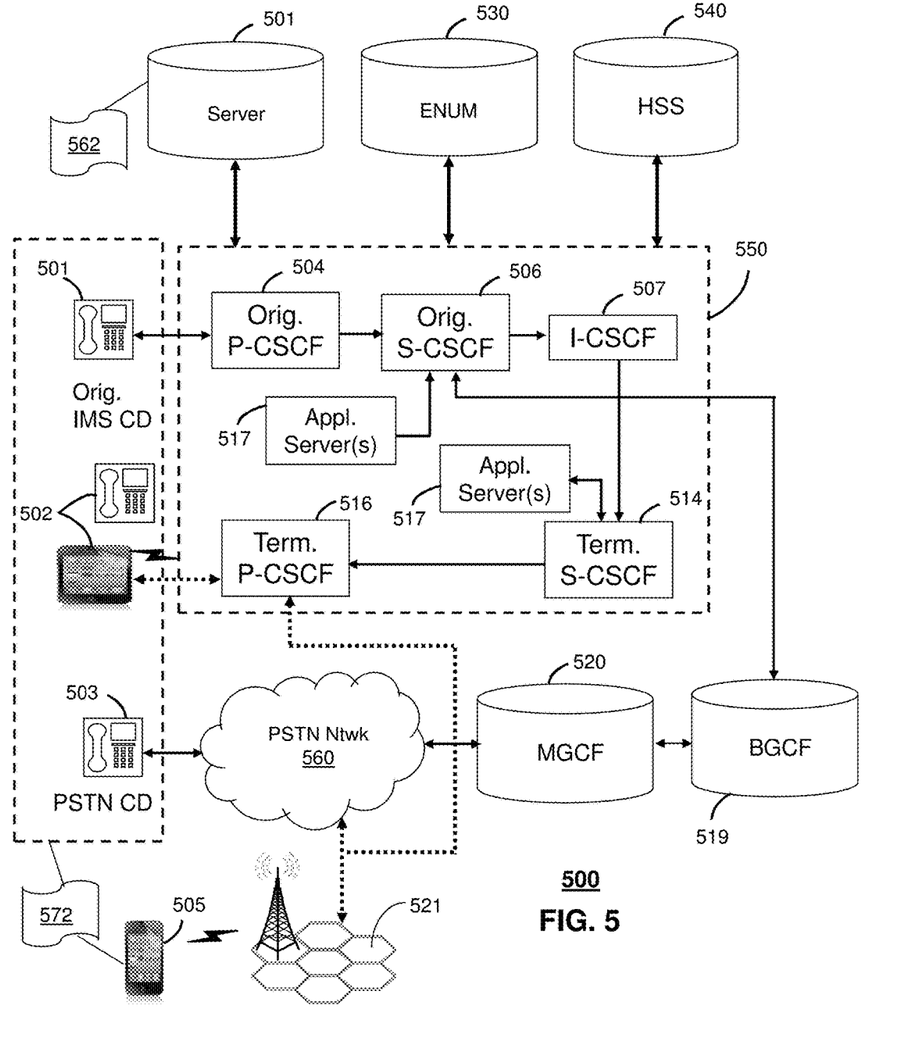
FIG. 5 depicts an illustrative embodiment of a communication system that provides communication services including circuit-switched data calls.

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 as another representative embodiment of communication system 100. System 500 can use an end user device generated tone (e.g., ANS tone, ANSam tone or other answer tone such as 2225 Hz) which causes CSD signaling in the modem and which triggers a re-invite of a Session Initiation Protocol (SIP) message with a higher bandwidth request and a G.711 code choice. The IMS core and the PCRF in conjunction can allow higher guaranteed bit rate for CSD calls. CSD protocols enable ANS/ANSam tones to be transmitted for up to 4 seconds. Establishing a higher bandwidth session using application layer can be performed within the tone generation time limit (e.g., can be done in about 100-500 ms after initial tone is detected). System 500 enables initially blocking the tone from reaching the CSD application of the other end user device. In one embodiment, renegotiation of higher bandwidth can be performed and then the tone is permitted to go through to the CSD application of the other end user device. The rest of the modem protocol can be negotiated over a G.711 codec. In one embodiment, system 500, through use of tone detection at a device, allows avoiding tone detection for all calls at network layer. In one embodiment, the tone detection and bandwidth adjustment for CSD calls can be made available based on subscription and/or being identified in a user profile Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

System 500 can include a server 501 that can perform tone detection and/or tone blocking. Server 501 can perform function 562 and thereby provide CSD call enhancement services to the CDs 501, 502, 503 and 505 of FIG. 5. CDs 501, 502, 503 and 505, which can be adapted with software to perform function 572 to utilize the services of the server 501, which can include generating a tone for initiating the re-invite procedure. In one embodiment, server 501 can be an integral part of the application server(s) 517 performing function 562.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
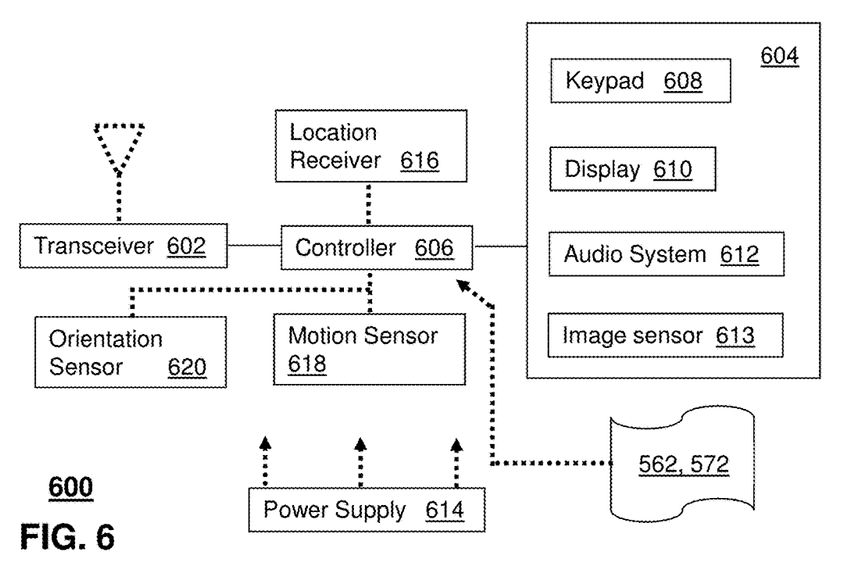
FIG. 6 depicts an illustrative embodiment of a communication device that can engage in or otherwise facilitate circuit-switched data calls.

FIG. 6 depicts an illustrative embodiment of a communication device 600. Communication device 600 can serve in whole or in part as an illustrative embodiment of the devices depicted in FIG. 1 and FIG. 5 and can be configured to perform portions of method 400 of FIG. 3. In one embodiment, communication device 600 can generate a tone during first communications with another communication device, where the first communications was established utilizing an invite message. The communication device 600 can provide the tone to a gateway or to another network device to cause the gateway (or other network device) to transmit a re-invite message without the gateway initially providing the tone to the other communication device. The communication device 600 can receive the re-invite message, where the re-invite message includes a request for a higher bandwidth than the first communications. The communication device 600 can provide a response message to the gateway responsive to the re-invite message, where the providing of the response message causes the gateway to provide the tone to the other communication device. The communication device 600 can enable second communications with the other communication device, where the second communications is established based on the re-invite and response messages, and where the second communications has the higher bandwidth than the first communications.

In one embodiment, the first communications is a voice call, and the communication device 600 receives user input during the voice call, where the generating of the tone is responsive to the user input. In one embodiment, the tone can include an ANS tone, an ANSam tone or a tone with a frequency of 2225 Hz. In one embodiment, the re-invite message can include an option for a pulse code modulation of voice frequencies coding. In one embodiment, the CSD call can be a facsimile communication, a medical alert communication, a point-of-sale communication, a telecommunications device for the deaf communication, a data modem communication, and any combination thereof.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the end user devices 110, the gateway 120, the IMS devices 150, and/or the EPC devices 175, as well as the IMS CDs 501-502 and PSTN CDs 503-505 of FIG. 5. It will be appreciated that the communication device 600 can also represent other devices that can operate in systems 100 and 500 such as a gaming console and a media player. In addition, the controller 606 can be adapted in various embodiments to perform the functions 562 and 572, respectively.

Upon reviewing the aforementioned embodiments, it would be evident to an artisan with ordinary skill in the art that said embodiments can be modified, reduced, or enhanced without departing from the scope of the claims described below. For example, other enhancements can be provided to the second communication session as a result of the re-invite procedure. Further, the enhancements can be based on various factors such as types of devices, types of services, subscriber agreements, network conditions, and so forth. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
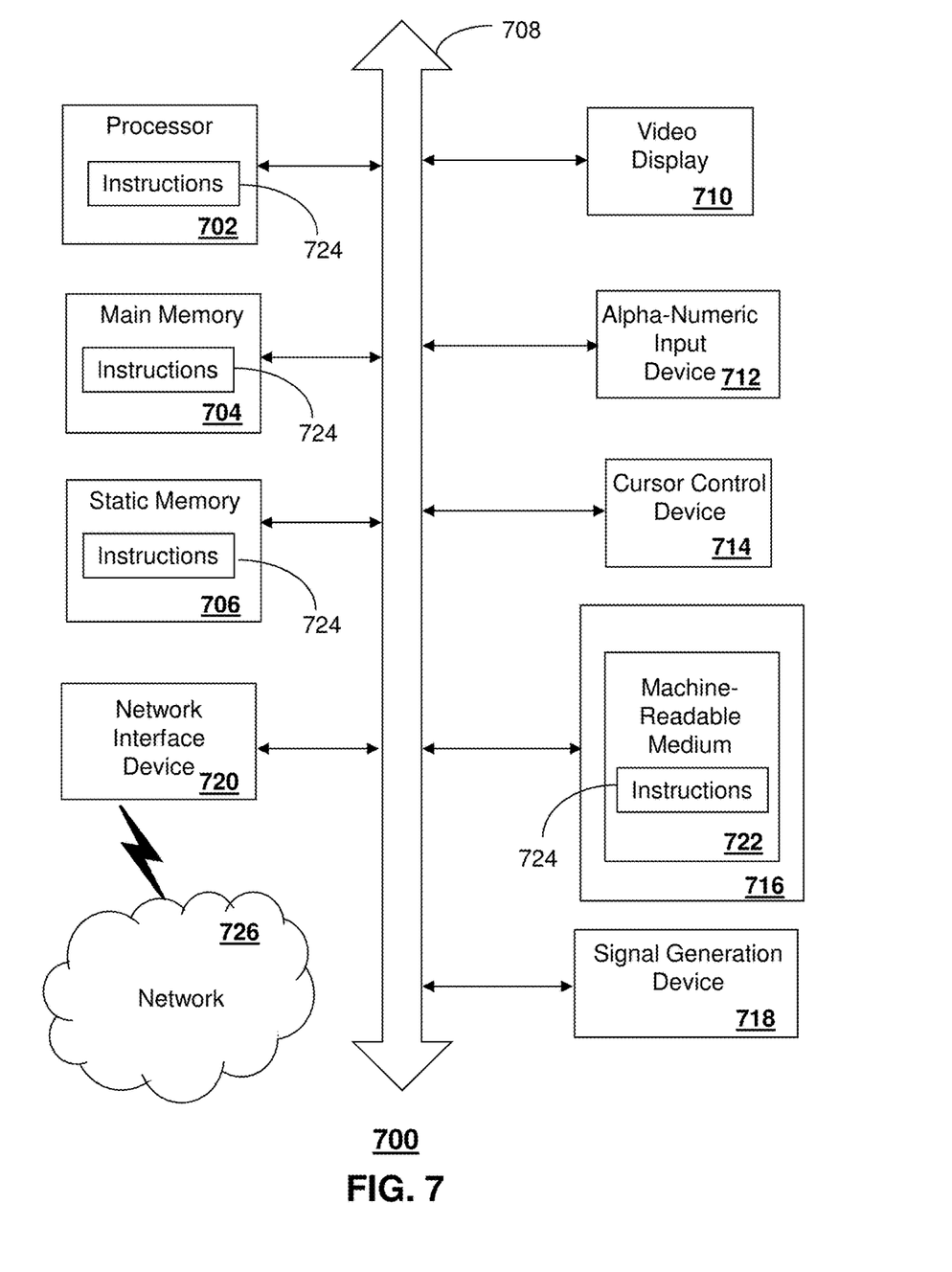
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the end user device 110, 210, 215, the gateway 120, the server 501 and other devices associated with FIGS. 1-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    facilitating, by a processing system including a gateway comprising a processor, a communication session between first and second end user devices utilizing a first invite message transmitted to the second end user device, the gateway being a separate device from the first and second end user devices;
    detecting, by the processing system, a tone generated by the second end user device, wherein the tone is generated in response to determining a billing delay;
    responsive to the detecting of the tone, facilitating, by the processing system, an adjustment to the communication session for initiating an adjusted communication session between the first and second end user devices utilizing a second invite message transmitted to the second end user device;
    monitoring, by the processing system, for a response message from the second end user device indicating that the second invite message was received at the second end user device,
    wherein the second invite message includes a request for an increased bandwidth in the adjusted communication session,
    wherein the tone is prevented from being transmitted to the first end user device prior to the adjustment to the communication session,
    and wherein the adjusted communication session is for a circuit-switched data call between the first and second end user devices having a greater bandwidth than the communication session; and
    providing, by the processing system, the tone to the first end user device after the adjustment to the communication session and in accordance with receiving the response message.

2. The method of claim 1, wherein the tone comprises an ANS tone or an ANSam tone.

3. The method of claim 2, wherein the second invite message includes an option for a pulse code modulation of voice frequencies coding.

4. The method of claim 1, wherein the communication session is a voice call between the first and second end user devices utilizing wireless access, and wherein the tone is generated by the second end user device during the voice call responsive to user input at the second end user device.

5. The method of claim 1, wherein the facilitating of the adjustment to the communication session for initiating the adjusted communication session is responsive to a determination that the second end user device is associated with a subscription agreement that allows for the adjusted communication session.

6. The method of claim 1, wherein the tone has a frequency of 2225 Hz.

7. The method of claim 1, wherein the circuit-switched data call is selected from a group consisting essentially of a facsimile communication, a medical alert communication, a point-of-sale communication, a telecommunications device for deaf communication, a data modem communication, and any combination thereof.

8. The method of claim 1, wherein the first and second invite messages are transmitted to the second end user device from the gateway via an internet protocol multimedia subsystem network.

9. A non-transitory machine-readable medium, comprising executable instructions that, when executed by a processing system including a processor of a gateway, facilitate performance of operations, comprising:
    initiating communications between first and second end user devices by providing a first invite message to the second end user device, the gateway being a separate device from the first and second end user devices;
    detecting a tone generated by the second end user device, wherein the tone is generated in response to determining a billing delay;
    responsive to the detecting of the tone, providing a second invite message to the second end user device without providing the tone to the first end user device, wherein the second invite message requests a greater bandwidth than the first invite message;
    monitoring for a response message associated with the second invite message from the second end user device for initiating a circuit-switched data call between the first and second end user devices;
    receiving the response message; and
    providing the tone to the first end user device after initiation of the circuit-switched data call and responsive to the receiving of the response message.

10. The non-transitory machine-readable medium of claim 9, wherein the second invite message is provided by the gateway during a voice call between the first and second end user devices that was initiated utilizing the first invite message, and wherein the processor comprises a plurality of processors operating in a distributed processing environment.

11. The non-transitory machine-readable medium of claim 10, wherein the tone is generated by the second end user device during the voice call responsive to user input at the second end user device.

12. The non-transitory machine-readable medium of claim 9, wherein the second invite message includes an option for a pulse code modulation of voice frequencies coding.

13. The non-transitory machine-readable medium of claim 9, wherein the tone comprises one of an ANS tone, an ANSam tone or a tone with a frequency of 2225 Hz.

14. The non-transitory machine-readable medium of claim 9, wherein the providing of the second invite message to the second end user device is responsive to a determination that the second end user device is associated with a subscription agreement that allows for an adjusted communication session with the greater bandwidth.

15. The non-transitory machine-readable medium of claim 9, wherein the circuit-switched data call is selected from a group consisting essentially of a facsimile communication, a medical alert communication, a point-of-sale communication, a telecommunications device for deaf communication, a data modem communication, and any combination thereof.

16. The non-transitory machine-readable medium of claim 9, wherein the first and second invite messages are transmitted to the second end user device from the gateway via an internet protocol multimedia subsystem network.

17. A communication device, comprising:
a processing system including a processor; and
a memory that stores executable instructions that, when executed by the processing system, facilitate performance of operations, comprising:
generating a tone during first communications with another communication device in response to detecting a billing delay, wherein the first communications was initiated utilizing an invite message;
providing the tone to a gateway to cause the gateway to transmit a re-invite message without the gateway providing the tone to the another communication device, the gateway being a separate device from the communication device and the another communication device;
receiving the re-invite message, wherein the re-invite message includes a request for a greater bandwidth than the first communications;
providing a response message to the gateway responsive to the receiving of the re-invite message, wherein the gateway performs monitoring for the response message, wherein receiving the response message by the gateway causes the gateway to provide the tone to the another communication device; and
enabling second communications with the another communication device, wherein the second communications is initiated based on the re-invite and response messages, wherein the tone is provided to the another communication device after initiation of the second communications, and wherein the second communications has the greater bandwidth than the first communications.

18. The communication device of claim 17, wherein the first communications is a voice call, wherein the operations further comprise receiving user input during the voice call, wherein the generating of the tone is responsive to the user input, and wherein the processor comprises a plurality of processors operating in a distributed processing environment.

19. The communication device of claim 17, wherein the second communications comprise a circuit-switched data call, wherein the tone comprises one of an ANS tone, an ANSam tone or a tone with a frequency of 2225 Hz, and wherein the re-invite message includes an option for a pulse code modulation of voice frequencies coding.

20. The communication device of claim 19, wherein the circuit-switched data call is selected from a group consisting essentially of a facsimile communication, a medical alert communication, a point-of-sale communication, a telecommunications device for deaf communication, a data modem communication, and any combination thereof.

* * * * *